(12) United States Patent
Parks et al.

(10) Patent No.: US 12,735,042 B2
(45) Date of Patent: Sep. 15, 2026

(54) SYSTEM AND METHOD TO EXECUTE AUTOMATIC LANE CHANGES INTO STOP-AND-GO TRAFFIC LANES

(71) Applicant: GM Global Technology Operations LLC, Detroit, MI (US)

(72) Inventors: Jeffrey Scott Parks, Ann Arbor, MI (US); Paul A. Adam, Milford, MI (US); Namal P. Kumara, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 90 days.

(21) Appl. No.: 19/020,227

(22) Filed: Jan. 14, 2025

(65) Prior Publication Data

US 2026/0200472 A1 Jul. 16, 2026

(51) Int. Cl.
*G01C 22/00* (2006.01)
*B60W 10/04* (2006.01)
(Continued)

(52) U.S. Cl.
CPC ...... *B60W 30/18163* (2013.01); *B60W 10/04* (2013.01); *B60W 10/18* (2013.01); *B60W 10/20* (2013.01); *B60W 30/18018* (2013.01); *B60W 40/04* (2013.01); *B60W 40/105* (2013.01); *B60W 50/00* (2013.01);
(Continued)

(58) Field of Classification Search
CPC ......... B60W 30/18163; B60W 60/001; B60W 10/04; B60W 10/18; B60W 10/20; B60W 30/18018; B60W 40/04; B60W 40/105; B60W 50/00; B60W 2556/50; B60W 2556/40; B60W 2554/4042; B60W 2554/406; B60W 2552/10; B60W 2554/4049; B60W 2050/0008; B60W 2050/0012; B60W 2050/0083; B60W 2520/10; B60W 2710/18; B60W 2710/20; B60W 2720/106; G08G 1/0137; G08G 1/052; G08G 1/167
See application file for complete search history.

(56) References Cited

U.S. PATENT DOCUMENTS

2024/0116511 A1* 4/2024 Gupta ............. B60W 30/18163

FOREIGN PATENT DOCUMENTS

DE 102014002115 A1 8/2015
DE 102017216202 A1 3/2019
(Continued)

*Primary Examiner* — Adam M Alharbi
(74) *Attorney, Agent, or Firm* — Vivacqua Crane, PLLC

(57) ABSTRACT

A system for operating a host vehicle to execute automatic lane changes into and out of stop-and-go traffic lanes includes sensors and actuators equipped to the host vehicle, and commanded by an automatic lane change (ALC) application executed by a controller. The ALC application calculates a velocity of other vehicles in an alternate lane, and calculates a size of openings between the other vehicles. The ALC application selectively determines openings are within a range and of a size for the host vehicle to fit. The ALC application commands the actuators of the host vehicle to automatically accelerate/decelerate the host vehicle in open loop control according to a calculated speed profile autonomously executes a lane change from a current host vehicle lane to a target alternate lane.

20 Claims, 4 Drawing Sheets

(51) Int. Cl.

| | |
|---|---|
| ***B60W 10/18*** | (2012.01) |
| ***B60W 10/20*** | (2006.01) |
| ***B60W 30/18*** | (2012.01) |
| ***B60W 40/04*** | (2006.01) |
| ***B60W 40/105*** | (2012.01) |
| ***B60W 50/00*** | (2006.01) |
| ***B60W 60/00*** | (2020.01) |
| ***G08G 1/01*** | (2006.01) |
| ***G08G 1/052*** | (2006.01) |
| ***G08G 1/16*** | (2006.01) |

(52) U.S. Cl.

CPC ......... *B60W 60/001* (2020.02); *G08G 1/0137* (2013.01); *G08G 1/052* (2013.01); *G08G 1/167* (2013.01); *B60W 2050/0008* (2013.01); *B60W 2050/0012* (2013.01); *B60W 2050/0083* (2013.01); *B60W 2520/10* (2013.01); *B60W 2552/10* (2020.02); *B60W 2554/4042* (2020.02); *B60W 2554/4049* (2020.02); *B60W 2554/406* (2020.02); *B60W 2556/40* (2020.02); *B60W 2556/50* (2020.02); *B60W 2710/18* (2013.01); *B60W 2710/20* (2013.01); *B60W 2720/106* (2013.01)

(56) References Cited

FOREIGN PATENT DOCUMENTS

| | | | |
|---|---|---|---|
| DE | 102022110247 | A1 | 11/2023 |
| DE | 102023115570 | A1 | 1/2024 |

* cited by examiner

SYSTEM AND METHOD TO EXECUTE AUTOMATIC LANE CHANGES INTO STOP-AND-GO TRAFFIC LANES

INTRODUCTION

The present disclosure relates to vehicles equipped with advanced driver assistance systems (ADAS), and more specifically to vehicles capable of fully and/or semi-autonomous driving modes.

Autonomously and/or semi-autonomously driven vehicles may, while in operation, utilize an algorithm for changing from a current lane to a lane populated by traffic actors, where the algorithm for changing lanes is operated in a closed loop manner to a space in between target vehicles.

However, while current systems and methods for executing automatic lane changes achieve their intended purpose, there is a need in the art for new and improved systems and methods for executing automatic lane changes into stop-and-go traffic lanes that can maintain operator comfort, maintain a planned route, and autonomously and/or semi-autonomously operate the vehicle in a manner that maintains operation within the system capability envelope while providing smooth and effective transitions between a current lane of travel and a stop-and-go lane in which a velocity of the vehicles in the stop-and-go lane is dramatically lower than the current lane of vehicle travel, and while maintaining or reducing system complexity, and while providing increased redundancy.

SUMMARY

According to several aspects a system for operating a host vehicle to execute automatic lane changes into and out of stop-and-go traffic lanes includes: a host vehicle. One or more sensors are equipped to the host vehicle and detect static and dynamic state information about the host vehicle. One or more actuators are equipped to the host vehicle and alter static and dynamic states of the host vehicle. The system further includes a controller having a processor, a memory, and input/output (I/O) ports. The I/O ports are in communication with the one or more sensors and the one or more actuators. The processor executes program code portions stored in the memory. The program code portions include an automatic lane change (ALC) application having at least first, second, third, fourth, and fifth control logics. The first control logic calculates a velocity of other vehicles in an alternate lane, and calculates a size of openings between the other vehicles. The second control logic determines that a difference between a host vehicle velocity and the velocity of the other vehicles is greater than a predetermined host vehicle deceleration limit. The third control logic determines that openings between the other vehicles are within a predetermined range and of a sufficiently large size for the host vehicle to fit. The fourth control logic commands one or more of the actuators of the host vehicle to perform an open loop acceleration of the host vehicle. The fifth control logic selectively engages one of a closed loop autonomous control of the host vehicle or escalates control of the host vehicle to a human host vehicle operator. The ALC application automatically accelerates the host vehicle according to a calculated host vehicle speed profile and causes the host vehicle to autonomously execute, via actuation of steering actuators and one or more of: powertrain actuators and braking actuators, a lane change from a current host vehicle lane to a target alternate vehicle lane. The current host vehicle lane has a substantially different velocity than the current target alternate vehicle lane.

In another aspect of the present disclosure the first control logic further includes control logic for calculating the velocity of the other vehicles in the alternate lane based according to a moving average of velocities of other vehicles in the target alternate vehicle lane. The moving average is stored in a buffer having a plurality of samples each lasting for a predetermined quantity of time. The buffer extends for approximately forty (40) seconds, and a total of five (5) samples are included in each buffer. The samples each extend for approximately eight (8) seconds, such that the calculated host vehicle speed profile is defined as a sliding average of eight buffers, totaling approximately three-hundred-twenty (320) seconds.

In yet another aspect of the present disclosure the system further includes control logic for calculating a host vehicle speed profile according to:

$$V_{dl} = \frac{\int_0^{K_t} \sum_0^n \frac{Vx_t}{n}}{K_t} \quad \text{Eq. 1}$$

where $V_{dl}$ is a velocity for a desired target alternate vehicle lane; $Vx_t$ is a longitudinal velocity of each individual object/or other vehicle in the desired target alternate vehicle lane such that 'x' refers to a longitudinal direction, and 't' refers to each individual object or other vehicle; n is a quantity of objects in the desired target alternate vehicle lane; and $K_t$ is a sample time window, where the sample time window $K_t$ is a hard-coded value calibrated for a variety of host vehicle operating conditions.

In yet another aspect of the present disclosure the system of claim 1, wherein the second control logic further includes control logic that, upon determining that a difference between a host vehicle velocity and the velocity of the other vehicles in the desired target alternate vehicle lane is greater than a predetermined host vehicle deceleration limit (K_v_DclLim), system executes the third control logic. Upon determining that the difference between a host vehicle velocity and the velocity of the other vehicles in the desired target alternate vehicle lane is less than or equal to the predetermined host vehicle deceleration limit (K_v_DclLim), the system executes: control logic that determines that a difference between the host vehicle velocity and the velocity of other vehicles in the desired target alternate vehicle lane is greater than a predetermined host vehicle acceleration limit (K_v_AclLim), and upon determining that the difference between the host vehicle velocity and the velocity of other vehicles in the desired target alternate vehicle lane is greater than the predetermined host vehicle acceleration limit (K_v_AclLim), executes the third control logic. Upon determining that the difference between the host vehicle velocity and the velocity of the other vehicles in the desired target alternate vehicle lane is less than or equal to the predetermined host vehicle acceleration limit (K_v_AclLim), the system ends ALC application control of the host vehicle.

In yet another aspect of the present disclosure third control logic further includes control logic for determining that openings between the other vehicles satisfy predefined maneuver limits including: a current host vehicle velocity (Vx), a velocity of other vehicles (V_dl) in the desired target alternate vehicle lane; a longitudinal length of an opening between other vehicles; the host vehicle deceleration limit (K_v_DclLim) and the host vehicle acceleration limit (K_v_AclLim); predefined mechanical and/or software implemented ADAS-based actuator actuation limits. An opening that is within the predetermined range is an opening within an area detectable by host vehicle sensors, and on a currently planned autonomously navigable driving route.

In yet another aspect of the present disclosure the fourth control logic further includes control logic for selectively engaging open loop control of the one or more actuators of the host vehicle to engage in an open loop acceleration or deceleration of the host vehicle until either: a predetermined time limit is exceeded, or a difference between the host vehicle velocity and the velocity of the other vehicles is less than or equal to the predetermined host vehicle acceleration limit (K_v_AclLim) or the predetermined host vehicle deceleration limit (K_v_DclLim).

In yet another aspect of the present disclosure the control logic for selectively engaging open loop control of the one or more actuators of the host vehicle to engage in an open loop acceleration or deceleration of the host vehicle until a predetermined time limit is exceeded further includes: control logic that utilizes a set of calibratable values to determine how long the host vehicle is operated in open-loop deceleration or open-loop acceleration without initiating a lane change from a current host vehicle lane into a target alternate vehicle lane. The calibratable values further include: a short-term time limit and a long-term time limit. The short-term time limit has a value of up to twenty seconds, and the long-term time limit having a value of up to two minutes. Each of the short-term and long-term time limits is based on global positioning system (GPS) information, high-definition (HD) map information, and host vehicle indicators.

In yet another aspect of the present disclosure the fourth control logic further includes: control logic for assessing an urgency of a lane change maneuver based on a plurality of factors including: a current host vehicle velocity, a distance or calculated quantity of time until the host vehicle will arrive at a route event. The route event includes one or more of: a lane split, a traffic backup, a traffic jam, a turn, a lane end, and a lane merge. Upon determining that the urgency of the lane change maneuver is low, executing control logic of the ALC application for calculating a quantity of time to a critical decision point; and upon determining that the urgency of the lane change maneuver is not low, the system creates a host vehicle speed profile with a lowest possible speed adjustment and continuing to autonomously execute the lane change maneuver.

In yet another aspect of the present disclosure the control logic for calculating a quantity of time to a critical decision point further includes: control logic for determining whether the quantity of time to the critical decision point is less than a predetermined minimum threshold time based in part upon: host vehicle speed, and a speed of other vehicles in target alternate vehicle lanes. Upon determining that the quantity of time to the critical decision point is less than the predetermined minimum threshold time, the system creates a speed profile with a highest possible speed adjustment and alerting the vehicle operator to take over control of the host vehicle for lane change execution.

In yet another aspect of the present disclosure upon determining that the quantity of time to the critical decision point is greater than or equal to the predetermined minimum threshold time, executing control logic for: calculating a host vehicle speed adjustment based on a critical distance and time; creating a speed profile based on the calculated host vehicle speed adjustment; and continuing to execute the automated lane change.

In yet another aspect of the present disclosure a method for operating a host vehicle to execute automatic lane changes into and out of stop-and-go traffic lanes includes: detecting static and dynamic state information about a host vehicle with one or more sensors equipped to the host vehicle, and altering static and dynamic states of the host vehicle with one or more actuators equipped to the host vehicle. The method further includes executing, by a processor of a controller of the host vehicle, program code portions stored in memory of the controller. The controller further includes input/output (I/O) ports in communication with the one or more sensors and the one or more actuators. The program code portions include an automatic lane change (ALC) application having control logic for: calculating a velocity of other vehicles in an alternate lane, and calculating a size of openings between the other vehicles; determining that a difference between a host vehicle velocity and the velocity of the other vehicles is greater than a predetermined host vehicle deceleration limit; and determining that openings between the other vehicles are within a predetermined range and of a sufficiently large size for the host vehicle to fit. The method further includes commanding one or more of the actuators of the host vehicle to perform an open loop acceleration of the host vehicle; and selectively engaging one of a closed loop autonomous control of the host vehicle or escalating control of the host vehicle to a human host vehicle operator. The ALC application automatically accelerates the host vehicle according to a calculated host vehicle speed profile and causes the host vehicle to autonomously execute, via actuation of steering actuators and one or more of: powertrain actuators and braking actuators, a lane change from a current host vehicle lane to an alternate lane. The current host vehicle lane has a substantially different velocity than the target alternate vehicle lane.

In yet another aspect of the present disclosure the method further includes calculating the velocity of the other vehicles in the alternate lane based according to a moving average of velocities of other vehicles in the target alternate vehicle lane. The moving average is stored in a buffer having a plurality of samples each lasting for a predetermined quantity of time. The buffer extends for approximately forty (40) seconds, and a total of five (5) samples are included in each buffer. The samples each extend for approximately eight (8) seconds, and the calculated host vehicle speed profile is defined as a sliding average of eight buffers, totaling approximately three-hundred-twenty (320) seconds.

In yet another aspect of the present disclosure the method further includes calculating a host vehicle speed profile according to:

$$V_{dl} = \frac{\int_0^{K_t} \sum_0^n \frac{Vx_t}{n}}{K_t} \quad \text{Eq. 1}$$

where $V_{dl}$ is a velocity for a desired target alternate vehicle lane; $Vx_t$ is a longitudinal velocity of each individual object/ or other vehicle in the desired target alternate vehicle lane such that 'x' refers to a longitudinal direction, and 't' refers to each individual object or other vehicle; n is a quantity of objects in the desired target alternate vehicle lane; and $K_t$ is a sample time window, where the sample time window $K_t$ is a hard-coded value calibrated for a variety of host vehicle operating conditions.

In yet another aspect of the present disclosure upon determining that a difference between a host vehicle velocity and the velocity of the other vehicles in the desired target alternate vehicle lane is greater than a predetermined host vehicle deceleration limit (K_v_DclLim), the method determines that openings between the other vehicles are within a predetermined range and of a sufficiently large size for the host vehicle to fit. Upon determining that the difference between a host vehicle velocity and the velocity of the other vehicles in the desired target alternate vehicle lane is less than or equal to the predetermined host vehicle deceleration limit (K_v_DclLim) the method determines that a difference between the host vehicle velocity and the velocity of other vehicles in the desired target alternate vehicle lane is greater than a predetermined host vehicle acceleration limit (K_v_AclLim). Upon determining that the difference between the host vehicle velocity and the velocity of other vehicles in the desired target alternate vehicle lane is greater than the predetermined host vehicle acceleration limit (K_v_AclLim), the method determines that openings between the other vehicles are within a predetermined range and of a sufficiently large size for the host vehicle to fit. Upon determining that the difference between the host vehicle velocity and the velocity of the other vehicles in the desired target alternate vehicle lane is less than or equal to the predetermined host vehicle acceleration limit (K_v_AclLim), the method ends ALC application control of the host vehicle.

In yet another aspect of the present disclosure the method determines that openings between the other vehicles satisfy predefined maneuver limits including: a current host vehicle velocity (Vx), a velocity of other vehicles (V_dl) in the desired target alternate vehicle lane; a longitudinal length of an opening between other vehicles; the host vehicle deceleration limit (K_v_DclLim) and the host vehicle acceleration limit (K_v_AclLim); predefined mechanical and/or software implemented ADAS-based actuator actuation limits. An opening that is within the predetermined range is an opening within an area detectable by host vehicle sensors, and on a currently planned autonomously navigable driving route.

In yet another aspect of the present disclosure the method selectively engaging open loop control of the one or more actuators of the host vehicle to engage in an open loop acceleration or deceleration of the host vehicle until either: a predetermined time limit is exceeded, or a difference between the host vehicle velocity and the velocity of the other vehicles is less than or equal to the predetermined host vehicle acceleration limit (K_v_AclLim) or the predetermined host vehicle deceleration limit (K_v_DclLim).

In yet another aspect of the present disclosure selectively engaging open loop control of the one or more actuators of the host vehicle to engage in an open loop acceleration or deceleration of the host vehicle until a predetermined time limit is exceeded further includes: utilizing a set of calibratable values to determine how long the host vehicle is operated in open-loop deceleration or open-loop acceleration without initiating a lane change from a current host vehicle lane into a target alternate vehicle lane. The calibratable values further include a short-term time limit and a long-term time limit. The short-term time limit has a value of up to twenty seconds, and the long-term time limit has a value of up to two minutes, each of the short-term and long-term time limits is based on global positioning system (GPS) information, high-definition (HD) map information, and host vehicle indicators.

In yet another aspect of the present disclosure assessing an urgency of a lane change maneuver based on a plurality of factors includes: a current host vehicle velocity, a distance or calculated quantity of time until the host vehicle will arrive at a route event. The route event includes one or more of: a lane split, a traffic backup, a traffic jam, a turn, a lane end, and a lane merge. Upon determining that the urgency of the lane change maneuver is low, the method executes control logic of the ALC application for calculating a quantity of time to a critical decision point. Upon determining that the urgency of the lane change maneuver is not low, the method creates a host vehicle speed profile with a lowest possible speed adjustment and continues to autonomously execute the lane change maneuver.

In yet another aspect of the present disclosure calculating a quantity of time to a critical decision point further includes: determining whether the quantity of time to the critical decision point is less than a predetermined minimum threshold time based in part upon: host vehicle speed, and a speed of other vehicles in target alternate vehicle lanes. Upon determining that the quantity of time to the critical decision point is less than the predetermined minimum threshold time, the method creates a speed profile with a highest possible speed adjustment and alerts the vehicle operator to take over control of the host vehicle for lane change execution. Upon determining that the quantity of time to the critical decision point is greater than or equal to the predetermined minimum threshold time, the method executes control logic for: calculating a host vehicle speed adjustment based on a critical distance and time, creates a speed profile based on the calculated host vehicle speed adjustment; and continues to execute the automated lane change.

In yet another aspect of the present disclosure a method for operating a host vehicle to execute automatic lane changes into and out of stop-and-go traffic lanes includes detecting static and dynamic state information about a host vehicle with one or more sensors equipped to the host vehicle, and altering static and dynamic states of the host vehicle with one or more actuators equipped to the host vehicle. The method further includes executing, by a processor of a controller of the host vehicle, program code portions stored in memory of the controller. The controller further includes input/output (I/O) ports in communication with the one or more sensors and the one or more actuators. The program code portions include an automatic lane change (ALC) application having control logic for: calculating a velocity of other vehicles in an alternate lane, and calculating a size of openings between the other vehicles, including: calculating the velocity of the other vehicles in the alternate lane based according to a moving average of velocities of other vehicles in the target alternate vehicle lane. The moving average is stored in a buffer having a plurality of samples each lasting for a predetermined quantity of time. The buffer extends for approximately forty (40) seconds, and a total of five (5) samples are included in each buffer. The samples each extend for approximately eight (8) seconds, so that the calculated host vehicle speed profile is defined as a sliding average of eight buffers, totaling approximately three-hundred-twenty (320) seconds. The method further includes calculating a host vehicle speed profile according to:

$$V_{dl} = \frac{\int_0^{K_t} \sum_0^n \frac{Vx_t}{n}}{K_t} \quad \text{Eq. 1}$$

where $V_{dl}$ is a velocity for a desired target alternate vehicle lane; $Vx_t$ is a longitudinal velocity of each individual object/ or other vehicle in the desired target alternate vehicle lane such that 'x' refers to a longitudinal direction, and 't' refers to each individual object or other vehicle; n is a quantity of objects in the desired target alternate vehicle lane; and $K_t$ is a sample time window, where sample time window $K_t$ is a hard-coded value calibrated for a variety of host vehicle operating conditions. The method further includes determining that a difference between a host vehicle velocity and the velocity of the other vehicles is greater than a predetermined host vehicle deceleration limit, where: upon determining that a difference between a host vehicle velocity and the velocity of the other vehicles in the desired target alternate vehicle lane is greater than a predetermined host vehicle deceleration limit (K_v_DclLim), the method determines that openings between the other vehicles are within a predetermined range and of a sufficiently large size for the host vehicle to fit; and upon determining that the difference between a host vehicle velocity and the velocity of the other vehicles in the desired target alternate vehicle lane is less than or equal to the predetermined host vehicle deceleration limit (K_v_DclLim); determining that a difference between the host vehicle velocity and the velocity of other vehicles in the desired target alternate vehicle lane is greater than a predetermined host vehicle acceleration limit (K_v_AclLim). Further, upon determining that the difference between the host vehicle velocity and the velocity of other vehicles in the desired target alternate vehicle lane is greater than the predetermined host vehicle acceleration limit (K_v_AclLim), the method determines that openings between the other vehicles are within a predetermined range and of a sufficiently large size for the host vehicle to fit. Upon determining that the difference between the host vehicle velocity and the velocity of the other vehicles in the desired target alternate vehicle lane is less than or equal to the predetermined host vehicle acceleration limit (K_v_AclLim), the method ends ALC application control of the host vehicle. The method further determines that openings between the other vehicles are within a predetermined range and of a sufficiently large size for the host vehicle to fit, including: determining that openings between the other vehicles satisfy predefined maneuver limits including: a current host vehicle velocity (Vx), a velocity of other vehicles (V_dl) in the desired target alternate vehicle lane; a longitudinal length of an opening between other vehicles; the host vehicle deceleration limit (K_v_DclLim) and the host vehicle acceleration limit (K_v_AclLim); predefined mechanical and/or software implemented ADAS-based actuator actuation limits. An opening that is within the predetermined range is an opening within an area detectable by host vehicle sensors, and on a currently planned autonomously navigable driving route. The method further includes commanding one or more of the actuators of the host vehicle to perform an open loop acceleration of the host vehicle, including: selectively engaging open loop control of the one or more actuators of the host vehicle to engage in an open loop acceleration or deceleration of the host vehicle until either: a predetermined time limit is exceeded, or a difference between the host vehicle velocity and the velocity of the other vehicles is less than or equal to the predetermined host vehicle acceleration limit (K_v_AclLim) or the predetermined host vehicle deceleration limit (K_v_DclLim). The predetermined time limit is defined by: utilizing a set of calibratable values to determine how long the host vehicle is operated in open-loop deceleration or open-loop acceleration without initiating a lane change from a current host vehicle lane into a target alternate vehicle lane. The calibratable values further include a short-term time limit and a long-term time limit. The short-term time limit has a value of up to twenty seconds, and the long-term time limit has a value of up to two minutes. Each of the short-term and long-term time limits is based on global positioning system (GPS) information, high-definition (HD) map information, and host vehicle indicators. When a difference between the host vehicle velocity and the velocity of the other vehicles is less than or equal to the predetermined host vehicle acceleration limit (K_v_AclLim) or the predetermined host vehicle deceleration limit (K_v_DclLim) the method assesses an urgency of a lane change maneuver based on a plurality of factors including: a current host vehicle velocity, a distance or calculated quantity of time until the host vehicle will arrive at a route event. The route event includes one or more of: a lane split, a traffic backup, a traffic jam, a turn, a lane end, and a lane merge. Upon determining that the urgency of the lane change maneuver is low, the method executes control logic of the ALC application for calculating a quantity of time to a critical decision point, including: determining whether the quantity of time to the critical decision point is less than a predetermined minimum threshold time based in part upon: host vehicle speed, and a speed of other vehicles in target alternate vehicle lanes; and upon determining that the quantity of time to the critical decision point is less than the predetermined minimum threshold time, the method creates a speed profile with a highest possible speed adjustment and alerts the vehicle operator to take over control of the host vehicle for lane change execution. Upon determining that the urgency of the lane change maneuver is not low, the method creates a host vehicle speed profile with a lowest possible speed adjustment and continuing to autonomously execute the lane change maneuver; and upon determining that the quantity of time to the critical decision point is greater than or equal to the predetermined minimum threshold time, the method executes control logic for: calculating a host vehicle speed adjustment based on a critical distance and time; creating a speed profile based on the calculated host vehicle speed adjustment; and continuing to execute the automated lane change. The method continues to execute the automated lane change by: selectively engaging one of a closed loop autonomous control of the host vehicle or escalating control of the host vehicle to a human host vehicle operator. The ALC application automatically accelerates the host vehicle according to the host vehicle speed profile and causes the host vehicle to autonomously execute, via actuation of steering actuators and one or more of: powertrain actuators and braking actuators, a lane change from a current host vehicle lane to an alternate lane. The current host vehicle lane has a substantially different velocity than the target alternate vehicle lane.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
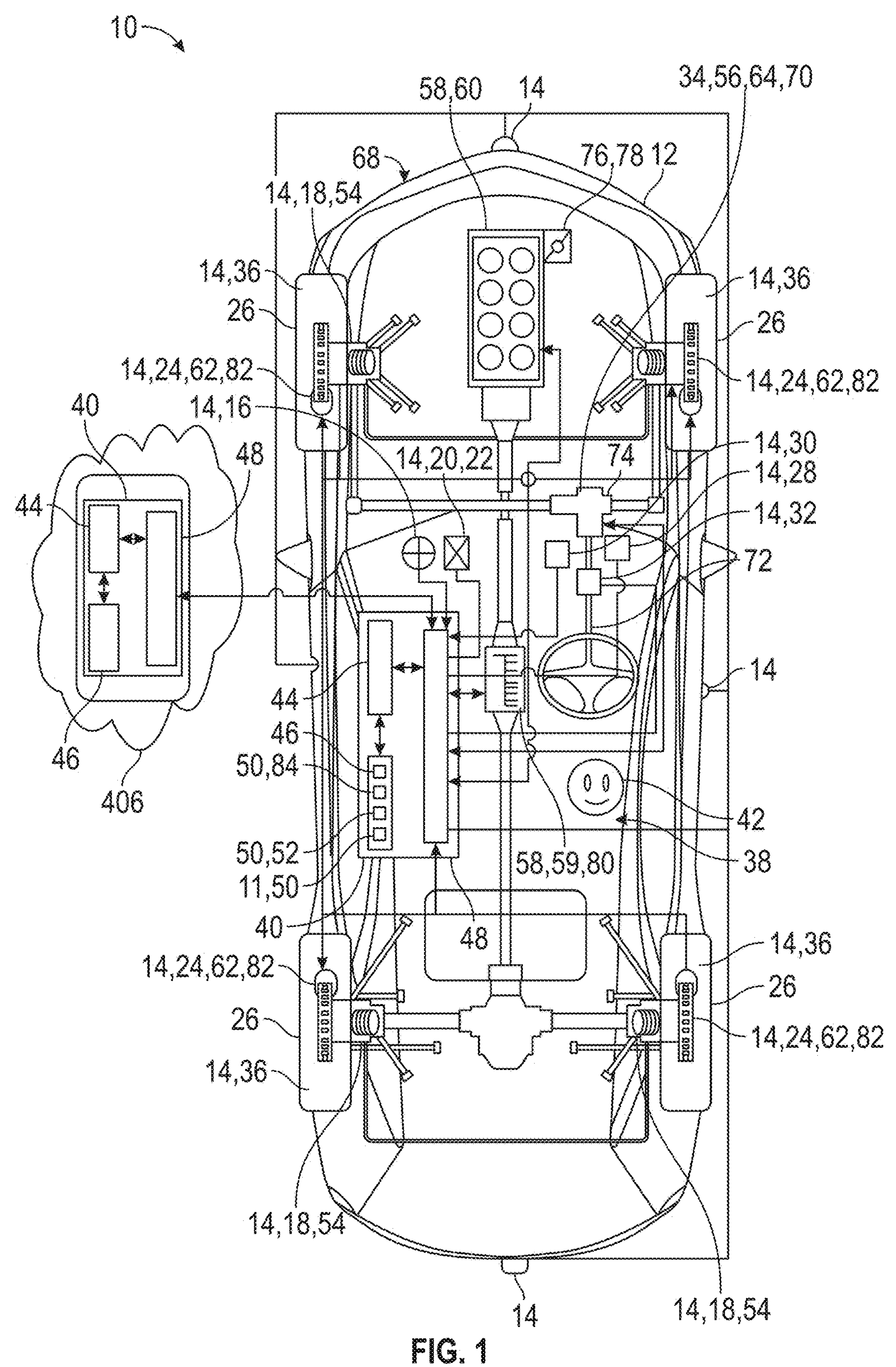
FIG. 1 is a schematic diagram of a host vehicle of a system for executing automatic lane changes into stop-and-go traffic lanes according to an exemplary embodiment.

Referring to FIG. 1, a system 10 for maneuver prediction-based speed profile adaptation for behavior-based automated cruise control (ACC) 11 is shown. The system 10 includes a vehicle 12. The host vehicle 12 is illustrated as a passenger vehicle, however, it should be appreciated that the host vehicle 12 may be any type of vehicle, including but not limited to: cars, trucks, sport utility vehicles (SUVs), vans, motor homes, semis, tractor-trailers, delivery vehicles including vehicles used within warehouses, tricycles, motorcycles, planes, amphibious vehicles, or any other such vehicle 12. Additionally, the host vehicle 12 may be an aircraft, a watercraft, or the like without departing from the scope or intent of the present disclosure.

The system 10 further includes one or more sensors 14 disposed on, attached to, or otherwise integrated into the host vehicle 12. Additional sensors 14 may be located remotely from the host vehicle 12, and communicate information to the host vehicle 12 as will be described in further detail below. Sensors 14 of the host vehicle 12 may include any of a wide variety of sensor types, including but not limited to: electromagnetic (EM) sensors 14 such as cameras, infra-red cameras, video cameras, light detection and ranging (LiDAR) sensors, radio detection and ranging (RADAR) sensors, sound navigation and ranging (SONAR) sensors, and the like. In some examples, cameras and/or other sensors 14 of the host vehicle 12 are mounted with exterior fields of view (FOVs), and data collected by such cameras include optical information about an environment in which the host vehicle 12 is operating. In additional non-limiting examples, the cameras and/or other sensors 14 are directed towards an interior or passenger compartment of the host vehicle 12, thereby providing information about host vehicle 12 occupants and host vehicle 12 operators. Additional sensors 14 may include, without limitation: inertial measurement units (IMUs) 16, suspension control units such as Semi Active Damping Suspension (SADS) sensors 18, global positioning system (GPS) 20 sensors 22, wheel speed sensors 24 capable of measuring rotational speeds of one or more wheels 26 of the host vehicle 12, throttle and/or accelerator pedal position sensors 28, brake pedal position sensors 30, steering position sensors 32 capable of measuring a steering system 34 position, steering rate, and steering velocity, tire pressure monitoring systems 36, and the like.

The IMUs 16 can measure host vehicle 12 movement, acceleration, and the like in several degrees of freedom. In a specific example, the IMUs 16 may measure position, movement, acceleration, etc. in at least three degrees of freedom. Likewise, the SADS sensors 18 may be IMUs 16 capable of measuring in three or more degrees of freedom. In some examples, the SADS 18 may be suspension hub accelerometers, or the like. The sensors 14 of the host vehicle 12 may therefore detect and record wheel speed data, host vehicle 12 position and location, host vehicle 12 static and dynamic state information such as velocity, acceleration, and the like.

As used herein, the terms “forward”, “rear”, “inner”, “inwardly”, “outer”, “outwardly”, “above”, and “below” are terms used relative to the orientation of the host vehicle 12 as shown in the drawings of the present application. Thus, “forward” refers to a direction toward a front of a vehicle 12, “rearward” refers to a direction toward a rear of a vehicle 12, “inner” and “inwardly” refers to a direction towards an interior or passenger compartment 38 of a vehicle 12, and “outer” and “outwardly” refers to a direction towards the exterior of a vehicle 12, “below” refers to a direction towards the bottom of the host vehicle 12, and “above” refers to a direction towards a top of the host vehicle 12.

The system 10 further includes one or more controllers 40 in communication with the various sensors 14 of the host vehicle 12, processes information received therefrom, and generates output signals that are used to assist the vehicle operator 42 in maintaining attention and avoiding highway hypnosis or white line fever. The controllers 40 are integrated into the host vehicle 12. More specifically, the controllers 40 are non-generalized, electronic control devices having a preprogrammed digital computer or processor 44, non-transitory computer readable medium or memory 46 used to store data such as control logic, software applications, instructions, computer code, data lookup tables, etc., and input/output (I/O) ports 48. Computer readable medium or memory 46 includes any type of medium capable of being accessed by a computer, such as read only memory (ROM), random access memory (RAM), a hard disk drive, a compact disk (CD), a digital video disc (DVD), or any other type of memory. A “non-transitory” computer readable memory 46 excludes wired, wireless, optical, or other communication links that transport transitory electrical or other signals. A non-transitory computer readable memory 46 includes media where data can be permanently stored, and media where data can be stored and later overwritten, such as a rewritable optical disc or an erasable memory device. Computer code includes any type of program code, including source code, object code, and executable code. The processor 44 is configured to execute the code or instructions. The host vehicle 12 may have additional controllers 40 such as a dedicated Wi-Fi controller, an engine control module, a transmission control module, a body control module, an infotainment control module, or the like. The I/O ports 48 may be configured to communicate via wired communications, wirelessly via Wi-Fi protocols under IEEE 802.11x, or the like without departing from the scope or intent of the present disclosure.

The controller 40 further includes one or more applications 50. An application 50 is a software program configured to perform a specific function or set of functions. The application 50 may include one or more computer programs, software components, sets of instructions, procedures, functions, objects, classes, instances, related data, or portions thereof adapted for implementation in a suitable computer readable program code. The applications 50 may be stored within the memory 46 or in additional or separate memory 46. Examples of applications 50 include audio or video streaming services, games, browsers, social media, etc. In other examples, the applications 50 are used to manage host vehicle 12 body control system functions; suspension control system 54 functions; steering control system 56 functions; powertrain 58 control system functions, including transmission 59 and/or engine 60 control system functions; braking system 62 control functions; or the like in an exemplary host vehicle 12. More specifically, the host vehicle 12 is equipped with a variety of control systems that manage static and dynamic host vehicle 12 performance characteristics via a plurality of onboard actuators 64 equipped to the host vehicle 12.

The actuators 64 may take any of a variety of different forms, and manage many distinct and/or interrelated host vehicle 12 control systems without departing from the scope or intent of the present disclosure. It will be appreciated that the actuators 64 may be electrically, hydraulically, pneumatically, mechanically, electromechanically, electrohydraulically, electropneumatically, magnetorheologically, hydropneumatically, electromagnetically, and/or any combination of the above types of actuatable devices that are used to alter one or more static and/or dynamic performance attributes of the host vehicle 12.

In some non-limiting examples, the suspension control system 54 includes one or more suspension system actuators 64 such as active or semi-active dampers 66 capable of altering a damping force transmitted from wheels 26 of the host vehicle 12 to a body 68 of the host vehicle 12 as the host vehicle 12 is driven on a road surface. The steering control system 56 actuators may include electric motors, electrohydraulic, electropneumatic, or other such motors or steering actuators 70 that apply torque to a steering shaft 72 or steering rack 74 of the host vehicle 12, and which thereby alter a direction of host vehicle 12 travel by altering a position or angular orientation of steerable wheels 26 of the host vehicle 12. By contrast, the onboard actuators 64 of the transmission 59 or engine 60 control system may include the transmission 59 or engine 60 themselves and/or actuating components therein which may alter a torque output or torque ratio of the engine 60 or transmission 59 or the like. In some non-limiting transmission 59 or engine 60 control system actuators 76 may include a throttle or e-throttle 78 capable of altering a torque output of the engine 60, a transmission actuator 80 capable of altering gear ratios and torque-outputs transmitted from the engine 60 through the transmission 59, and the like. It should further be appreciated that while the host vehicle 12 shown in FIG. 1 is equipped with an internal combustion engine (ICE) 60, that the engine 60 may be any type of engine 60 or prime mover, such as an ICE engine 60, an electric motor, a hybrid-electric engine 60, combinations thereof, or any other type of known engine 60 type without departing from the scope or intent of the present disclosure. Similarly, the braking system 62 actuators 64 include brakes 82 of the host vehicle 12 capable of selectively retarding a rotational speed of the wheels 26 of the host vehicle 12, and thereby altering a velocity of the host vehicle 12 itself.

The host vehicle 12 may be operated in any one of a variety of different modes, including a fully manual mode, in which the vehicle operator 42 has full control of host vehicle 12 static and dynamic performance characteristics. In other non-limiting examples, the host vehicle 12 may be operated in fully or semi-autonomous modes that control some or all of the static and dynamic performance of the host vehicle 12. More specifically, the system 10 of the present disclosure operates on a host vehicle 12 having advanced driver assistance systems (ADAS) 84 capable of controlling automatic cruise control (ACC) 11 functions, steering, braking, and any of a variety of other means of controlling onboard host vehicle 12 systems.

Referring to FIGS. 2A and 2B and again to FIG. 1, the system 10 utilizes one or more applications 50, specifically an automatic lane change (ALC) application 52 that utilizes sensor 14 data, vehicle operator 42 preference data, location data, and the like to adjust an ACC 11 speed profile of the host vehicle 12 while simultaneously providing vehicle operators 42 with comfortable, accurate, and properly engaged course corrections via ADAS 84 navigation of a planned route into and/or out of alternate vehicle lanes 86 having dramatically different ambient velocities than a current host vehicle lane 88. Alternate vehicle lanes 86 may include any of a variety of different types of lanes on a road segment without departing from the scope or intent of the present disclosure. In some non-limiting examples, the alternate vehicle lanes 86 may include adjacent lanes 90, exiting lanes 92, merging lanes 94, and/or any lanes on a road segment that are adjacent to or otherwise separated from the host vehicle lane 88. It will further be appreciated that the alternate vehicle lanes 86 may be lanes populated with other vehicles 12' traveling at the same or substantially different speeds as the host vehicle 12. In the non-limiting example of FIG. 2A, the other vehicles 12' populating the exiting lanes 92 are traveling at approximately 25 miles-per-hour (mph), where the host vehicle 12 is traveling in the host vehicle lane 88 at a speed of approximately 60 mph. By contrast, in FIG. 2B, the other vehicles 12' are accelerating in merging lanes 94 from approximately 25 mph to highway speeds of approximately 60 mph. In the example of FIG. 2B, the host vehicle 12 is traveling in a host vehicle lane 88 that also happens to be a merging lane 94 that merges with and causes vehicles 12, 12' to enter a highway having an ambient speed of approximately 60 mph.

Figure 2A:
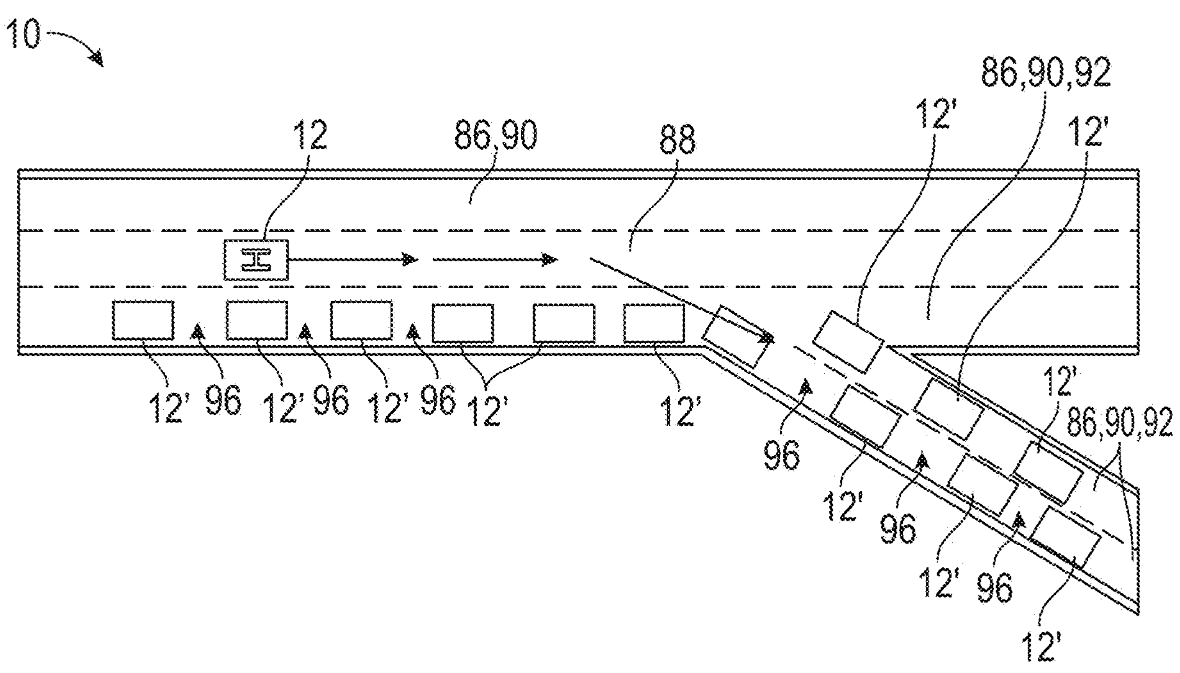
FIG. 2A is a perspective top view of a road segment upon which a host vehicle of equipped with the system for executing automatic lane changes into stop-and-go traffic lanes of FIG. 1 is being decelerated prior to a lane change according to an exemplary embodiment.
Figure 2B:
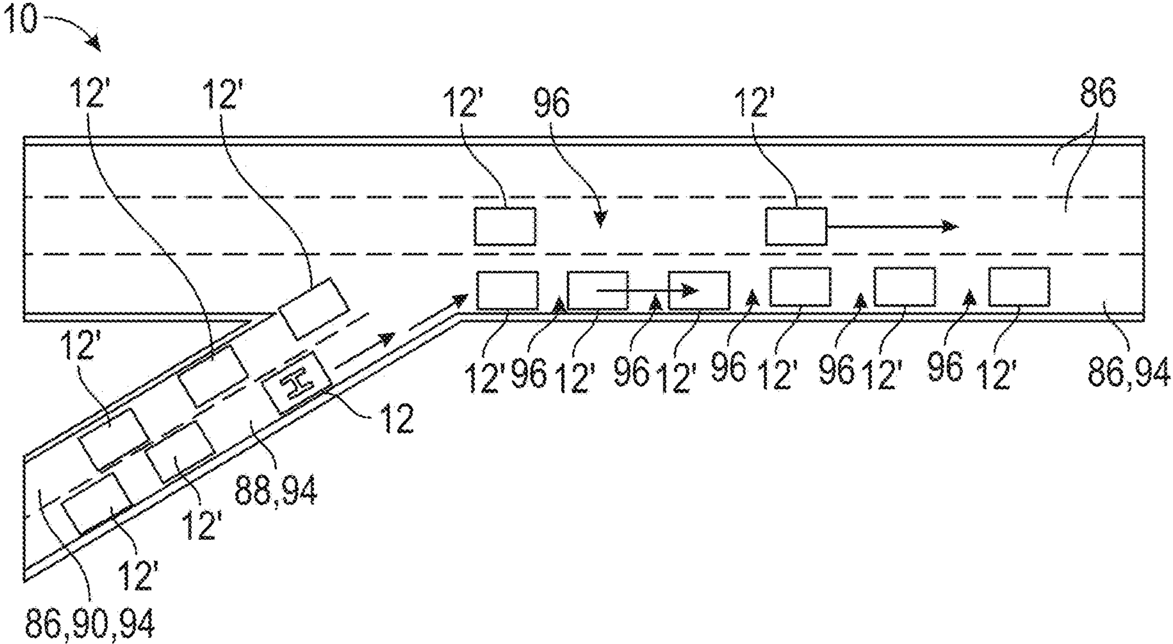
FIG. 2B is a perspective top view of a road segment upon which a host vehicle of equipped with the system for executing automatic lane changes into stop-and-go traffic lanes of FIG. 1 is being accelerated prior to a lane merge according to an exemplary embodiment.
Figure 3:
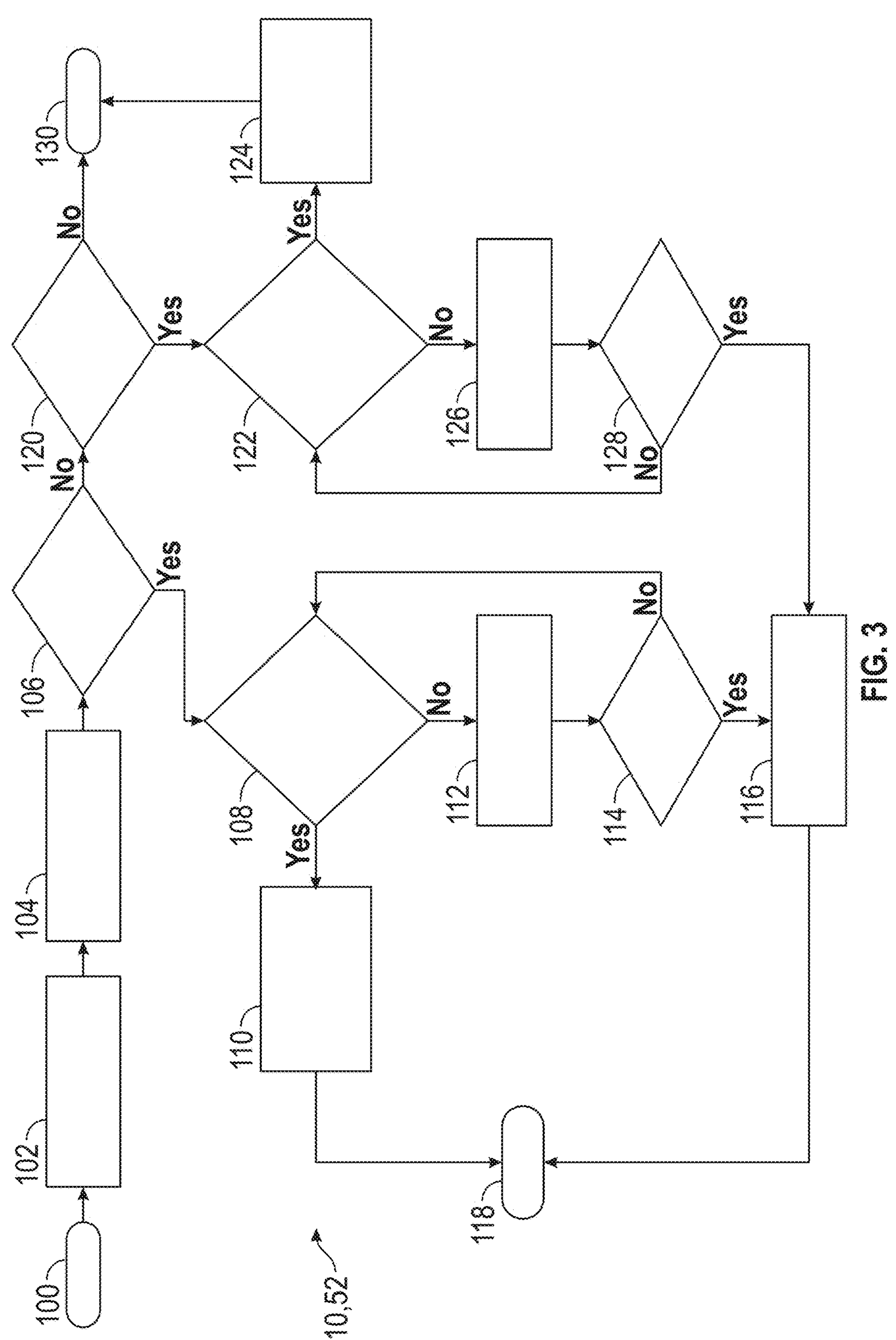
FIG. 3 is a flowchart depicting logical flow of the system for executing automatic lane changes into stop-and-go traffic lanes of FIG. 1 according to an exemplary embodiment.

Referring now to FIG. 3 and with continuing reference to FIGS. 1, 2A and 2B, the ALC application 52 is shown in further detail in flowchart form. The ALC application 52 utilizes sensor 14 data, processed through a series of logical steps that will be described herein in further detail, to actively, accurately, and smoothly adapt an ADAS 84 operated ACC 11 speed of the host vehicle 12 to merge the host vehicle 12 into an alternate vehicle lane 86 with a substantially different ambient speed than the original or current host vehicle lane 88. More specifically, the system 10 and ALC application 52 provide for host vehicle 12 acceleration and deceleration that falls within a defined pleas-ability envelope for vehicle occupants 42. The pleas-ability envelope may vary from application to application, and from vehicle operator 42 to vehicle operator 42, but in some non-limiting examples, the pleas-ability envelope covers acceleration up to and including approximately +/−1.5 $m/sec^2$ for high delta velocity scenarios. It will further be appreciated that as a velocity delta between the current host vehicle lane 88 and a targeted alternate vehicle lane 86 grows, detection of gaps 96 between other vehicles 12' becomes increasingly important. In experiments, simple interpolation of such gaps 96 has shown that the executing lane changes where the velocity delta is greater than approximately 5.7 m/second is difficult to achieve, and that typical freeway splits are in the range of approximately 4.37 m/sec to approximately 8 m/sec before exiting or splitting lanes are considered to be blocked by an average human vehicle operator 42. Accordingly, the system 10 and ALC application 52 operate in an open-loop fashion to decelerate and/or accelerate the host vehicle 12 into an effective operational range for closed loop control of the host vehicle 12. Accordingly, it will be appreciated that the terms "substantially different speeds" or "substantially different velocities" as used herein are intended to mean speed or velocity differences exceeding about 5.7 meters-per-second (m/s).

The ALC application 52 as shown in FIG. 3 begins at block 100. At block 102, the system 10 and ALC application 52, using sensor 14 data, calculates a velocity of a targeted or desired alternate vehicle lane 86. At block 104, the system 10 and ALC application 52 calculate a size of openings or gaps 96 between other vehicles 12' in the targeted alternate vehicle lane 86. Subsequently, at block 106, the system 10 and ALC application 52 determine whether a difference between the host vehicle 12 velocity (Vx) and the velocity of the desired or targeted alternate vehicle lane 86 (V_dl) is greater than a predetermined host vehicle 12 deceleration limit (K_v_DclLim). Upon determining that the difference is greater than the predetermined host vehicle 12 deceleration limit (K_v_DclLim), the system 10 and ALC application 52 proceed to block 108. While the host vehicle 12 deceleration limit (K_v_DclLim) may vary substantially from application to application, and based on a particular vehicle operator's 42 personal preferences, the host vehicle 12 deceleration limit (K_v_DclLim) should be understood to be a maximal acceleration/deceleration rate that maintains vehicle operator 42 pleas-ability. That is, the host vehicle 12 deceleration limit (K_v_DclLim) defines a maximal limit of the pleas-ability envelope, including acceleration up to and including approximately +/−1.5 m/sec$^2$ for high delta velocity scenarios.

At block 108, after determining that the difference between the host vehicle 12 velocity (Vx) and velocity of the desired or targeted alternate vehicle lane 86 (V_dl) is greater than the host vehicle 12 deceleration limit (K_v_DclLim), the system 10 and ALC application 52 determine whether an opening or gap 96 between other vehicles 12' in the target alternate vehicle lane 86 is in range and large enough for the host vehicle 12 to execute a lane change within predefined maneuver limits. In non-limiting examples, in order for the opening or gap 96 to satisfy predefined maneuver limits, a longitudinal length of the opening or gap 96 and the current host vehicle 12 speed, as well as the ambient velocity of the desired or targeted alternate vehicle lane 86 (V_dl) are compared to predefined maneuver limits. The predefined maneuver limits may vary substantially from application to application, situation to situation, and from vehicle operator 42 to vehicle operator 42 based on a variety of factors. These factors include the current host vehicle 12 velocity (Vx), the velocity of the other vehicles 12' in the targeted alternate vehicle lane 86 (V_dl), the longitudinal length of an opening or gap 96 between other vehicles 12' in the targeted lane, and the host vehicle 12 deceleration limit (K_v_DclLim). Further predefined maneuver limits or thresholds may include, but are not limited to: GPS-based route guidance, predefined mechanical and/or software-implemented ADAS-based actuator 64 actuation limits, and the like. Such ADAS-based actuator 64 actuation limits may include a maximal and/or minimal steerable wheel 26 articulation angle for a particular host vehicle 12 velocity (Vx), a maximal and/or minimal longitudinal acceleration and/or deceleration limit or rate limit for a given host vehicle 12 velocity (Vx), and the like. In addition, it should be appreciated that in order for a gap 96 to be "in range", the gap 96 is within an area detectable by the host vehicle 12 sensors 14, and that the gap 96 is on the currently planned autonomously-navigable driving route, and that the gap 96 may be feasibly navigated into by the ADAS 84 and ACC 11 of the host vehicle 12 without exceeding any of the host vehicle 12 deceleration limit (K_v_DclLim), acceleration limit (K_v_AclLim), or the pleas-ability envelope.

Upon determining that an opening or gap 96 between other vehicles 12' in the target alternate vehicle lane 86 is in range and large enough for the host vehicle 12 to execute a lane change within predefined maneuver limits, the system 10 and ALC application 52 proceed to block 110, where the system 10 and ALC application 52 transition to closed loop control, and commands closed-loop deceleration of the host vehicle 12 via actuation of actuators 64 of the powertrain 58 control system, including transmission 59 and/or engine 60 control systems; and/or via actuation of actuators 64 of the braking system 62; or the like while also commanding steering control system 56 actuators to alter a direction of host vehicle 12 travel by altering a position or angular orientation of steerable wheels 26 of the host vehicle 12 and thereby smoothly navigating the host vehicle 12 through the lane change and into one of the gaps 96 in the target alternate vehicle lane 86.

However, upon determining that an opening or gap 96 between other vehicles 12' in the target alternate vehicle lane 86 is not range and/or is not large enough for the host vehicle 12 to execute a lane change within predefined maneuver limits, the system 10 and ALC application 52 proceed to block 112 where the system 10 and ALC application 52 command an open loop deceleration of the host vehicle 12 via actuation of actuators 64 of the powertrain 58 control system, including transmission 59 and/or engine 60 control systems; and/or via actuation of actuators 64 of the braking system 62; or the like.

During the open loop control at block 114, the system 10 and ALC application 52 determine whether a predetermined time limit has been exceeded. The predetermined time limit may vary from application to application, from situation to situation, and from vehicle operator 42 to vehicle operator 42, based on a variety of factors. However, it should be understood that the predetermined time limit is a set of calibratable values that determine how long the host vehicle 12 should be operated in an open-loop deceleration mode without initiating a lane change from the current host vehicle lane 88 to one of the alternate lanes 86. The predetermined time limit may include a short-term time limit value and a long-term time limit value, each having a sliding or adjustable window. In some non-limiting examples, the short-term time limit value may be up to seven (7) seconds, or up to twenty (20) seconds, and the long-term time limit value may be up to one (1) minute, or up to two (2) minutes, depending on the host vehicle 12 driving conditions. The predetermined time limit, including the short-term and long-term time limits is based in part on GPS information, High-Definition (HD) map information, host vehicle 12 indicators (i.e. turn signals), other vehicle 12' indicators (i.e. other vehicle 12' turn signals), and onboard host vehicle 12 sensors 14 and actuators 64.

At block 116, upon determining that the predetermined time limit has been exceeded, the system 10 and ALC application 52 abort any pending autonomously-derived lane change attempts, and escalate a notification and/or control to the vehicle operator 42. From blocks 110 and/or 116, the system 10 and ALC application 52 proceed to block 118 where the ALC application 52 ends, and cedes at least partial control of the host vehicle 12 to the vehicle operator 42.

However, when at block 114, the predetermined time limit has not been exceeded, the system 10 and ALC application 52 return to block 108, where the system 10 and ALC application 52 continuously determine whether an opening or gap 96 between other vehicles 12' in the target alternate vehicle lane 86 is in range and large enough for the host vehicle 12 to execute a lane change.

Referring back to block 106, upon determining that the difference between the host vehicle 12 velocity (Vx) and the velocity of the desired or targeted alternate vehicle lane 86 (V_dl) is less than or equal to the predetermined host vehicle 12 deceleration limit (K_v_DclLim), the system 10 and ALC application 52 proceed to block 120. Blocks 120-130 show and describe similar logical processes of the system 10 and ALC application 52 to those described above with respect to host vehicle 12 deceleration from a host vehicle lane 88 to an alternate lane 86 in which the ambient velocity is less than the host vehicle velocity (Vx) in blocks 106-118. However, blocks 120-130 define a series of logical steps of the system 10 and ALC application 52 that apply to situations in which the host vehicle 12 is accelerating from a current host vehicle lane 88 to an alternate lane 86 in which the velocity of the desired or targeted alternate vehicle lane 86 (V_dl) is greater than the current host vehicle velocity (Vx).

At block 120, after determining that the difference between the velocity of the desired or targeted alternate vehicle lane 86 (V_dl) and the host vehicle 12 velocity (Vx) is greater than the host vehicle 12 acceleration limit (K_v_AclLim), the system 10 and ALC application 52 proceed to block 122 where the system and ALC application 52 determine whether an opening or gap 96 between other vehicles 12' in the target alternate vehicle lane 86 is in range and large enough for the host vehicle 12 to execute a lane change within predefined maneuver limits. As previously described, in non-limiting examples, in order for the opening or gap 96 to satisfy predefined maneuver limits, a longitudinal length of the opening or gap 96 and the current host vehicle 12 speed, as well as the ambient velocity of the desired or targeted alternate vehicle lane 86 (V_dl) are compared to predefined maneuver limits. The predefined maneuver limits may vary substantially from application to application, situation to situation, and from vehicle operator 42 to vehicle operator 42 based on a variety of factors. These factors include the current host vehicle 12 velocity (Vx), the velocity of the other vehicles 12' in the targeted alternate vehicle lane 86 (V_dl), the longitudinal length of an opening or gap 96 between other vehicles 12' in the targeted lane, and the host vehicle 12 acceleration limit (K_v_AclLim). Further predefined maneuver limits or thresholds may include, but are not limited to: GPS-based route guidance, predefined mechanical and/or software-implemented ADAS-based actuator 64 actuation limits, and the like. Such ADAS-based actuator 64 actuation limits may include a maximal and/or minimal steerable wheel 26 articulation angle for a particular host vehicle 12 velocity (Vx), a maximal and/or minimal longitudinal acceleration and/or deceleration limit or rate limit for a given host vehicle 12 velocity (Vx), and the like.

Upon determining that an opening or gap 96 between other vehicles 12' in the target alternate vehicle lane 86 is in range and large enough for the host vehicle 12 to execute a lane change within predefined maneuver limits, the system 10 and ALC application 52 proceed to block 124, where the system 10 and ALC application 52 transition to closed loop control and commands closed-loop acceleration of the host vehicle 12 via actuation of actuators 64 of the powertrain 58 control system, including transmission 59 and/or engine 60 control systems; and/or via actuation of actuators 64 of the braking system 62; or the like while also commanding steering control system 56 actuators to alter a direction of host vehicle 12 travel by altering a position or angular orientation of steerable wheels 26 of the host vehicle 12 and thereby smoothly navigating the host vehicle 12 through the lane change and into one of the gaps 96 in the target alternate vehicle lane 86.

However, upon determining that an opening or gap 96 between other vehicles 12' in the target alternate vehicle lane 86 is not range and/or is not large enough for the host vehicle 12 to execute a lane change within predefined maneuver limits, the system 10 and ALC application 52 proceed to block 126 where the system 10 and ALC application 52 command an open loop acceleration of the host vehicle 12 via actuation of actuators 64 of the powertrain 58 control system, including actuators 64 or the transmission 59 and/or engine 60 control systems; braking system 62; and the like.

During the open loop acceleration control at block 126, the system 10 and ALC application 52 determine whether a predetermined time limit has been exceeded. The predetermined time limit may vary from application to application, from situation to situation, and from vehicle operator 42 to vehicle operator 42, based on a variety of factors. However, it should be understood that the predetermined time limit is a set of calibratable values that determine how long the host vehicle 12 should be operated in an open-loop deceleration mode without initiating a lane change from the current host vehicle lane 88 to one of the alternate lanes 86. The predetermined time limit may include a short-term time limit value and a long-term time limit value, each having a sliding or adjustable window. In some non-limiting examples, the short-term time limit value may be up to seven (7) seconds, or up to twenty (20) seconds, and the long-term time limit value may be up to one (1) minute, or up to two (2) minutes, depending on the host vehicle 12 driving conditions. The predetermined time limit, including the short-term and long-term time limits is based in part on GPS information, High-Definition (HD) map information, indicators, and onboard host vehicle 12 sensors 14 and actuators 64.

Upon determining at block 128 that the predetermined time limit has been exceeded, the system 10 and ALC application 52 proceed to block 116 and abort any pending autonomously-derived lane change attempts, and escalate a notification and/or control to the vehicle operator 42. The system 10 and ALC application 52 subsequently proceed to block 118 where the ALC application 52 ends, and cedes at least partial control of the host vehicle 12 to the vehicle operator 42.

However, when at block 128, the predetermined time limit has not been exceeded, the system 10 and ALC application 52 return to block 122, where the system 10 and ALC application 52 continuously determine whether an opening or gap 96 between other vehicles 12' in the target alternate vehicle lane 86 is in range and large enough for the host vehicle 12 to execute a lane change.

Referring back to block 106, upon determining that the difference between the host vehicle 12 velocity (Vx) and the velocity of the desired or targeted alternate vehicle lane 86 (V_dl) is less than or equal to the predetermined host vehicle 12 acceleration limit (K_v_AclLim), the system 10 and ALC application 52 proceed to block 130, where the ALC application 52 ends, and cedes at least partial control of the host vehicle 12 to the vehicle operator 42. Likewise, when at block 124 the system 10 and ALC application 52 transition to closed loop control of the host vehicle, then the system 10 and ALC application 52 proceed to block 130 where the ALC application 52 ends.

It will be appreciated from the above that blocks 120-130 show and describe similar logical processes of the system 10 and ALC application 52 to those described above with respect to host vehicle 12 deceleration from a host vehicle lane 88 to an alternate lane 86 in which the ambient velocity is less than the host vehicle velocity (Vx) in blocks 106-118. However, blocks 120-130 define a series of logical steps of the system 10 and ALC application 52 that apply to situations in which the host vehicle 12 is accelerating from a current host vehicle lane 88 to an alternate lane 86 in which the velocity of the desired or targeted alternate vehicle lane 86 (V_dl) is greater than the current host vehicle velocity (Vx).

Figure 4:
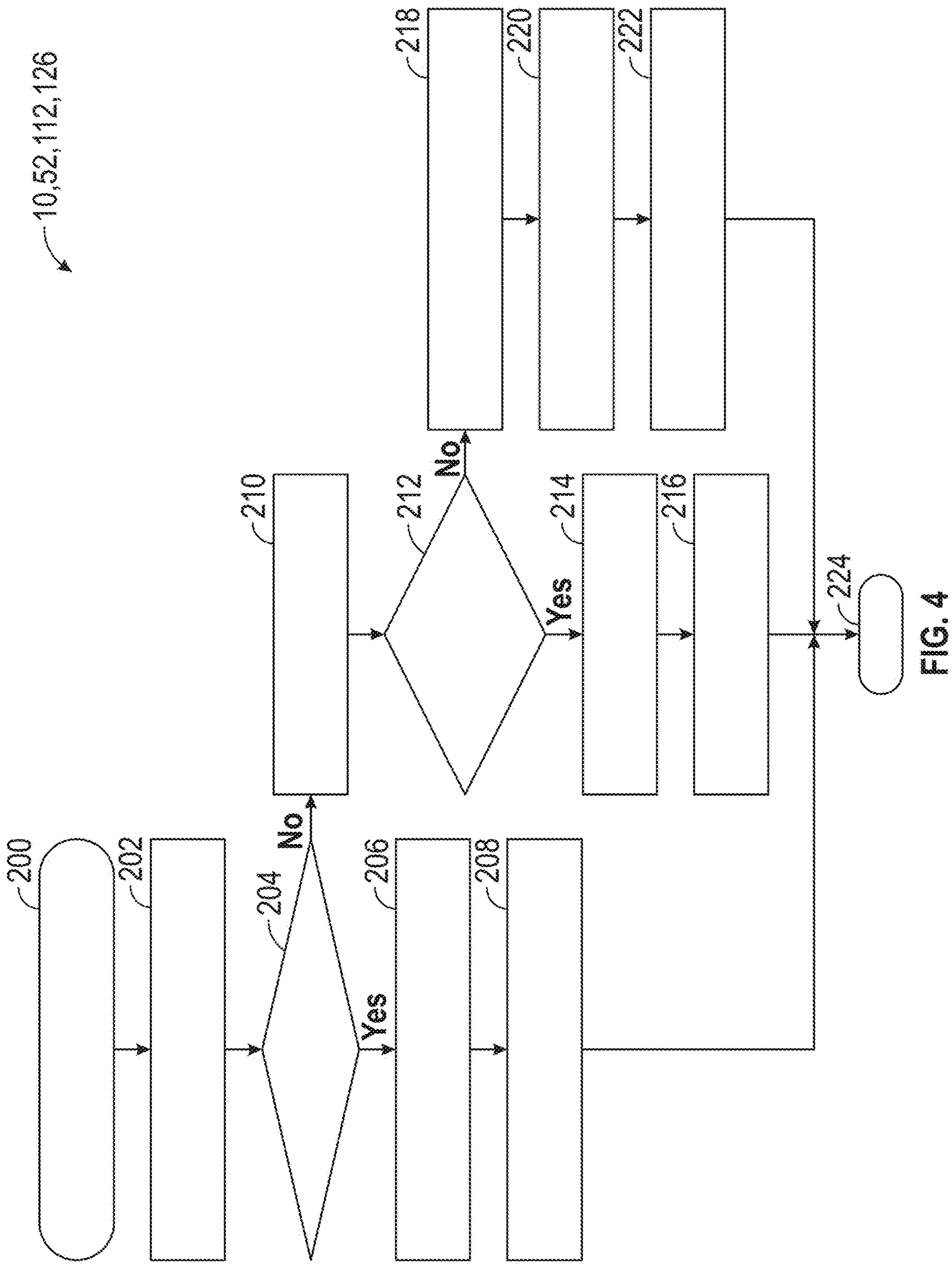
FIG. 4 is a flowchart depicting logical flow of an open loop acceleration/deceleration portion of the system for executing automatic lane changes into stop-and-go traffic lanes of FIG. 3 according to an exemplary embodiment.

Referring now to FIG. 4 and with continuing reference to FIGS. 1-3, a portion of the system 10 and ALC application 52 relating to a calculated urgency of a lane change are shown in further detail in flowchart form.

More specifically FIG. 4 depicts the open loop control portion of the ALC application 52 initiated at either of blocks 108 or 122 in FIG. 3. The open loop control loop depicted in FIG. 4 may thus be regarded as applying similarly to either decelerating or accelerating the host vehicle 12 to maneuver the host vehicle 12 into an appropriate gap 96 in an alternate lane 86. The open loop control portion of the ALC application 52 begins at block 200. At block 202, the system 10 and ALC application 52 assess the urgency of a lane change maneuver for the host vehicle 12. In several aspects, the relative urgency of the lane change maneuver is a calculated value dependent upon a variety of factors, including but not limited to: current velocity of the host vehicle 12, a distance or calculated quantity of time until the host vehicle 12 will arrive at a route event such as a lane split, a traffic backup or traffic jam in one or more road lanes on a current route or road segment of a route, a turn, a lane end, a lane merge, or the like, as well as a criticality of such route events, and the like. The criticality of a route event is a ranking of importance of the route event relative to the planned navigation route, and relative to alternative route options that most closely maintain host vehicle 12 target arrival times at a planned destination. Criticality and urgency of route events may also relate to the need to change lanes for emergency vehicles, to avoid obstacles in a particular lane, and the like. At block 204, the system 10 and ALC application 52 determine whether the relative urgency of the lane change maneuver is low. A low relative urgency of the lane change maneuver indicates that the system 10 and ALC application 52 find that the desired or planned lane change maneuver is achievable with open loop deceleration or acceleration under normal operating conditions, and that the acceleration or deceleration profile of the host vehicle 12 to achieve the planned or desired lane change maneuver fall within the pleas-ability envelope for the vehicle operator 42 or occupants. Upon determining at block 204 that the urgency of the lane change maneuver is low, the system 10 and ALC application 52 proceed to block 206 where the system 10 and ALC application 52 create a speed profile with a lowest possible speed adjustment for the host vehicle 12. The speed profile may vary from application to application, and from circumstance to circumstance without departing from the scope or intent of the present disclosure. In several aspects, the speed profile is a moving average of velocities of other vehicles 12' in the target alternate vehicle lane 86. In some non-limiting examples, the speed profile includes a plurality of samples each lasting for a predetermined quantity of time. The buffer of some non-limiting examples extends for approximately forty (40) seconds, and a total of five (5) samples may be included in each buffer. Each of the samples in each buffer is defined by a sliding or adjustable window of time. In some examples, the samples extend for approximately eight (8) seconds. Accordingly, in one non-limiting example, the speed profile includes eight (8) buffers and therefore resulting in a speed profile or average over a total of approximately three-hundred-twenty (320) seconds. However, it should be understood that the speed profile is generally calculated according to:

$$V_{dl} = \frac{\int_0^{K_t} \sum_0^n \frac{Vx_t}{n}}{K_t} \quad \text{Eq. 1}$$

where $V_{dl}$ is a velocity for the desired target alternate vehicle lane; $Vx_t$ is the longitudinal velocity of each individual object/or other vehicle 12' in the desired lane such that 'x' refers to a longitudinal direction, and 't' refers to each individual object or other vehicle 12'; n is a quantity of objects in the desired target alternate vehicle lane; and $K_t$ is a sample time window. The sample time window $K_t$ may vary from application to application, but should be appreciated to be a hard-coded value calibrated for a variety of host vehicle 12 operating conditions. Subsequently, at block 208, the system 10 and ALC application 52 continue to execute an automated lane change.

However, when at block 204, the urgency of the lane change maneuver is determined not to be low, the system 10 and ALC application 52 proceed to block 210. At block 210, the system 10 and ALC application 52 calculate a time to a critical decision point. In several aspects, the critical decision point defines a route event, as described hereinabove. That is, the critical decision point may include any of a variety of navigational decision points, such as a lane split, a traffic backup or traffic jam in one or more road lanes on a current road segment, a turn, a lane end, a merge, or the like. The system 10 and ALC application 52 then determine at block 212 whether a time to the critical decision point is less than a predetermined minimum threshold time. The predetermined minimum threshold time may vary substantially depending on a road type, a physical location of the host vehicle 12, a host vehicle 12 speed, a speed of other vehicles 12' in the target alternate vehicle lanes 86, as well as other factors not enumerated specifically herein, but relating to the immediacy or urgency of a lane change relative to the autonomously navigated route upon which the host vehicle 12 is currently traveling. Upon determining that the time to the decision point is less than the predetermined minimum threshold time, the system 10 and ALC application 52 proceed to block 214. At block 214, the system 10 and ALC application 52 create a speed profile with a highest possible host vehicle 12 speed adjustment based on the defined pleas-ability envelope for vehicle operators 42 or occupants. The system 10 and ALC application 52 then proceed to block 216 where the vehicle operator 42 is notified or alerted that vehicle operator 42 control is required to execute the desired or planned lane change, as the calculated highest possible host vehicle 12 speed adjustment exceeds the pleas-ability envelope. In several aspects, when the time to the decision point is less than the predetermined minimum threshold time, and the highest possible host vehicle 12 speed adjustment exceeds the pleas-ability envelope, exit conditions for the ALC application 52 are met, and the system 10 and ALC application 52 may additionally offer the vehicle operator 42 alternate route plans while re-engaging ACC 11 to bring the host vehicle 12 back to the ambient speed of traffic in the host vehicle lane 88, whereupon the system 10 reinitializes or otherwise restarts the ALC application 52.

However, when at block 212, the time to the decision point is greater than or equal to the predetermined minimum threshold time, the system 10 and ALC application 52 proceed to block 218. At block 218, the system 10 and ALC application 52 calculate a host vehicle 12 speed adjustment based on a critical distance and time to the critical decision point. Subsequently, at block 220, based on the calculated speed adjustment from block 218, the system 10 and ALC application 52 create a host vehicle 12 speed profile, and at block 222, the system 10 and ALC application 52 continue to execute an automated lane change that utilizes the host vehicle 12 speed profile from block 222. From each of blocks 208, 216, and 222, the system 10 and ALC application 52 proceed to block 224 where the open loop control portion of the ALC application 52 exits.

A system 10 and ALC application 52 of the present disclosure offers several advantages. These include the ability to automatically execute lane changes into and/or out of stop-and-go traffic lanes while maintaining vehicle operator 42 comfort, maintaining the host vehicle's 12 travel along a planned route, and autonomously and/or semi-autonomously operating the host vehicle 12 in a manner that confines autonomous host vehicle 12 operation within the system 10 capability envelope while providing smooth and effective transitions between a current host vehicle lane 88 of travel and a stop-and-go alternate lane 86 in which a velocity of the other vehicles 12' in the alternate stop-and-go lane 86 is dramatically lower or higher than the current host vehicle lane 88 of travel, and while maintaining or reducing system 10 complexity, operating on existing host vehicle 12 hardware, and while providing increased redundancy.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for operating a host vehicle to execute automatic lane changes into and out of stop-and-go traffic lanes, the system comprising:

a host vehicle;

one or more sensors equipped to the host vehicle and detecting static and dynamic state information about the host vehicle;

one or more actuators equipped to the host vehicle and altering static and dynamic states of the host vehicle;

a controller having a processor, a memory, and input/output (I/O) ports, the I/O ports in communication with the one or more sensors and the one or more actuators, the processor executing program code portions stored in the memory, the program code portions including an automatic lane change (ALC) application comprising:

a first control logic for calculating a velocity of other vehicles in an alternate lane, and calculating a size of openings between the other vehicles;

a second control logic for determining that a difference between a host vehicle velocity and the velocity of the other vehicles is greater than a predetermined host vehicle deceleration limit;

a third control logic for determining that openings between the other vehicles are within a predetermined range and of a sufficiently large size for the host vehicle to fit;

a fourth control logic for commanding one or more of the actuators of the host vehicle to perform an open loop acceleration of the host vehicle; and a fifth control logic for selectively engaging one of a closed loop autonomous control of the host vehicle or escalating control of the host vehicle to a human host vehicle operator, wherein the ALC application automatically accelerates the host vehicle according to a calculated host vehicle speed profile and causes the host vehicle to autonomously execute, via actuation of steering actuators and one or more of: powertrain actuators and braking actuators, a lane change from a current host vehicle lane to a target alternate vehicle lane, wherein the current host vehicle lane has a substantially different velocity than the target alternate vehicle lane.

2. The system of claim 1, wherein the first control logic further comprises:

control logic for calculating the velocity of the other vehicles in the alternate lane based according to a moving average of velocities of other vehicles in the target alternate vehicle lane, wherein the moving average is stored in a buffer having a plurality of samples each lasting for a predetermined quantity of time; wherein the buffer extends for approximately forty (40) seconds, and a total of five (5) samples are included in each buffer; and wherein the samples each extend for approximately eight (8) seconds, wherein the calculated host vehicle speed profile is defined as a sliding average of eight buffers, resulting totaling approximately three-hundred-twenty (320) seconds.

3. The system of claim 2, further comprising:

control logic for calculating a host vehicle speed profile according to:

$$V_{dl} = \frac{\int_0^{K_t} \sum_0^n \frac{Vx_t}{n}}{K_t} \quad \text{Eq. 1}$$

where $V_{dl}$ is a velocity for a desired target alternate vehicle lane; $Vx_t$ is a longitudinal velocity of each individual object/or other vehicle in the desired target alternate vehicle lane such that 'x' refers to a longitudinal direction, and 't' refers to each individual object or other vehicle; n is a quantity of objects in the desired target alternate vehicle lane; and $K_t$ is a sample time window, where the sample time window $K_t$ is a hard-coded value calibrated for a variety of host vehicle operating conditions.

4. The system of claim 1, wherein the second control logic further comprises:

control logic that, upon determining that a difference between a host vehicle velocity and the velocity of the other vehicles in the desired target alternate vehicle lane is greater than a predetermined host vehicle deceleration limit (K_v_DclLim), executes the third control logic; and upon determining that the difference between a host vehicle velocity and the velocity of the other vehicles in the desired target alternate vehicle lane is less than or equal to the predetermined host vehicle deceleration limit (K_v_DclLim), executes:

control logic that determines that a difference between the host vehicle velocity and the velocity of other vehicles in the desired target alternate vehicle lane is greater than a predetermined host vehicle acceleration limit (K_v_AclLim); and upon determining that the difference between the host vehicle velocity and the velocity of other vehicles in the desired target alternate vehicle lane is greater than the predetermined host vehicle acceleration limit (K_v_AclLim), executes the third control logic; and upon determining that the difference between the host vehicle velocity and the velocity of the other vehicles in the desired target alternate vehicle lane is less than or equal to the predetermined host vehicle acceleration limit (K_v_AclLim), ends ALC application control of the host vehicle.

5. The system of claim 4, wherein the third control logic further comprises:

control logic for determining that openings between the other vehicles satisfy predefined maneuver limits including: a current host vehicle velocity (Vx), a velocity of other vehicles (V_dl) in the desired target alternate vehicle lane; a longitudinal length of an opening between other vehicles; the host vehicle deceleration limit (K_v_DclLim) and the host vehicle acceleration limit (K_v_AclLim); predefined mechanical and/or software implemented ADAS-based actuator actuation limits; and wherein an opening that is within the predetermined range is an opening within an area detectable by host vehicle sensors, and on a currently planned autonomously navigable driving route.

6. The system of claim 5, wherein the fourth control logic further comprises:

control logic for selectively engaging open loop control of the one or more actuators of the host vehicle to engage in an open loop acceleration or deceleration of the host vehicle until either:

a predetermined time limit is exceeded, or a difference between the host vehicle velocity and the velocity of the other vehicles is less than or equal to the predetermined host vehicle acceleration limit (K_v_AclLim) or the predetermined host vehicle deceleration limit (K_v_DclLim).

7. The system of claim 5, wherein the control logic for selectively engaging open loop control of the one or more actuators of the host vehicle to engage in an open loop acceleration or deceleration of the host vehicle until a predetermined time limit is exceeded further comprises:

control logic that utilizes a set of calibratable values to determine how long the host vehicle is operated in open-loop deceleration or open-loop acceleration without initiating a lane change from a current host vehicle lane into a target alternate vehicle lane, and wherein the calibratable values further comprise:

a short-term time limit and a long-term time limit, the short-term time limit having a value of up to twenty seconds, and the long-term time limit having a value of up to two minutes; and each of the short-term and long-term time limits is based on global positioning system (GPS) information, high-definition (HD) map information, and host vehicle indicators.

8. The system of claim 6, wherein the fourth control logic further comprises:

control logic for assessing an urgency of a lane change maneuver based on a plurality of factors comprising: a current host vehicle velocity, a distance or calculated quantity of time until the host vehicle will arrive at a route event, wherein the route event comprises one or more of: a lane split, a traffic backup, a traffic jam, a turn, a lane end, and a lane merge;

upon determining that the urgency of the lane change maneuver is low, executing control logic of the ALC application for calculating a quantity of time to a critical decision point; and upon determining that the urgency of the lane change maneuver is not low, creating a host vehicle speed profile with a lowest possible speed adjustment and continuing to autonomously execute the lane change maneuver.

9. The system of claim 8, wherein the control logic for calculating a quantity of time to a critical decision point further comprises:

control logic for determining whether the quantity of time to the critical decision point is less than a predetermined minimum threshold time based in part upon: host vehicle speed, and a speed of other vehicles in target alternate vehicle lanes; and upon determining that the quantity of time to the critical decision point is less than the predetermined minimum threshold time, creating a speed profile with a highest possible speed adjustment and alerting the vehicle operator to take over control of the host vehicle for lane change execution.

10. The system of claim 9, wherein upon determining that the quantity of time to the critical decision point is greater than or equal to the predetermined minimum threshold time, executing control logic for:

calculating a host vehicle speed adjustment based on a critical distance and time;

creating a speed profile based on the calculated host vehicle speed adjustment; and continuing to execute the automated lane change.

11. A method for operating a host vehicle to execute automatic lane changes into and out of stop-and-go traffic lanes, the method comprising:

detecting static and dynamic state information about a host vehicle with one or more sensors equipped to the host vehicle;

altering static and dynamic states of the host vehicle with one or more actuators equipped to the host vehicle;

executing, by a processor of a controller of the host vehicle, program code portions stored in memory of the controller, the controller further including input/output (I/O) ports in communication with the one or more sensors and the one or more actuators, the program code portions including an automatic lane change (ALC) application comprising control logic for:

calculating a velocity of other vehicles in an alternate lane, and calculating a size of openings between the other vehicles;

determining that a difference between a host vehicle velocity and the velocity of the other vehicles is greater than a predetermined host vehicle deceleration limit;

determining that openings between the other vehicles are within a predetermined range and of a sufficiently large size for the host vehicle to fit;

commanding one or more of the actuators of the host vehicle to perform an open loop acceleration of the host vehicle; and selectively engaging one of a closed loop autonomous control of the host vehicle or escalating control of the host vehicle to a human host vehicle operator, wherein the ALC application automatically accelerates the host vehicle according to a calculated host vehicle speed profile and causes the host vehicle to autonomously execute, via actuation of steering actuators and one or more of: powertrain actuators and braking actuators, a lane change from a current host vehicle lane to an alternate lane, wherein the current host vehicle lane has a substantially different velocity than a target alternate vehicle lane.

12. The method of claim 11, further comprising:

calculating the velocity of the other vehicles in the alternate lane based according to a moving average of velocities of other vehicles in the target alternate vehicle lane; wherein the moving average is stored in a buffer having a plurality of samples each lasting for a predetermined quantity of time; wherein the buffer extends for approximately forty (40) seconds, and a total of five (5) samples are included in each buffer; and wherein the samples each extend for approximately eight (8) seconds, wherein the calculated host vehicle speed profile is defined as a sliding average of eight buffers, totaling approximately three-hundred-twenty (320) seconds.

13. The method of claim 12, further comprising:

calculating a host vehicle speed profile according to:

$$V_{dl} = \frac{\int_0^{K_t} \sum_0^n \frac{Vx_t}{n}}{K_t} \quad \text{Eq. 1}$$

where $V_{dl}$ is a velocity for a desired target alternate vehicle lane; $Vx_t$ is a longitudinal velocity of each individual object/or other vehicle in the desired target alternate vehicle lane such that 'x' refers to a longitudinal direction, and 't' refers to each individual object or other vehicle; n is a quantity of objects in the desired target alternate vehicle lane; and $K_t$ is a sample time window, where the sample time window $K_t$ is a hard-coded value calibrated for a variety of host vehicle operating conditions.

14. The method of claim 11, further comprising:

upon determining that a difference between a host vehicle velocity and the velocity of the other vehicles in the desired target alternate vehicle lane is greater than a predetermined host vehicle deceleration limit (K_v_DclLim), determining that openings between the other vehicles are within a predetermined range and of a sufficiently large size for the host vehicle to fit; and upon determining that the difference between a host vehicle velocity and the velocity of the other vehicles in the desired target alternate vehicle lane is less than or equal to the predetermined host vehicle deceleration limit (K_v_DclLim);

determining that a difference between the host vehicle velocity and the velocity of other vehicles in the desired target alternate vehicle lane is greater than a predetermined host vehicle acceleration limit (K_v_AclLim); and upon determining that the difference between the host vehicle velocity and the velocity of other vehicles in the desired target alternate vehicle lane is greater than the predetermined host vehicle acceleration limit (K_v_AclLim), determining that openings between the other vehicles are within a predetermined range and of a sufficiently large size for the host vehicle to fit; and upon determining that the difference between the host vehicle velocity and the velocity of the other vehicles in the desired target alternate vehicle lane is less than or equal to the predetermined host vehicle acceleration limit (K_v_AclLim), ending ALC application control of the host vehicle.

15. The method of claim 14, further comprising:

determining that openings between the other vehicles satisfy predefined maneuver limits including: a current host vehicle velocity (Vx), a velocity of other vehicles (V_dl) in the desired target alternate vehicle lane; a longitudinal length of an opening between other vehicles; the host vehicle deceleration limit (K_v_DclLim) and the host vehicle acceleration limit (K_v_AclLim); predefined mechanical and/or software implemented ADAS-based actuator actuation limits; and wherein an opening that is within the predetermined range is an opening within an area detectable by host vehicle sensors, and on a currently planned autonomously navigable driving route.

16. The method of claim 15, further comprising:

selectively engaging open loop control of the one or more actuators of the host vehicle to engage in an open loop acceleration or deceleration of the host vehicle until either:

a predetermined time limit is exceeded, or a difference between the host vehicle velocity and the velocity of the other vehicles is less than or equal to the predetermined host vehicle acceleration limit (K_v_AclLim) or the predetermined host vehicle deceleration limit (K_v_DclLim).

17. The method of claim 15, wherein selectively engaging open loop control of the one or more actuators of the host vehicle to engage in an open loop acceleration or deceleration of the host vehicle until a predetermined time limit is exceeded further comprises:

utilizing a set of calibratable values to determine how long the host vehicle is operated in open-loop deceleration or open-loop acceleration without initiating a lane change from a current host vehicle lane into a target alternate vehicle lane, wherein the calibratable values further comprise:

a short-term time limit and a long-term time limit, the short-term time limit having a value of up to twenty seconds, and the long-term time limit having a value of up to two minutes, each of the short-term and long-term time limits is based on global positioning system (GPS) information, high-definition (HD) map information, and host vehicle indicators.

18. The method of claim 16, further comprising:

assessing an urgency of a lane change maneuver based on a plurality of factors comprising: a current host vehicle velocity, a distance or calculated quantity of time until the host vehicle will arrive at a route event, wherein the route event comprises one or more of: a lane split, a traffic backup, a traffic jam, a turn, a lane end, and a lane merge;

upon determining that the urgency of the lane change maneuver is low, executing control logic of the ALC application for calculating a quantity of time to a critical decision point; and upon determining that the urgency of the lane change maneuver is not low, creating a host vehicle speed profile with a lowest possible speed adjustment and continuing to autonomously execute the lane change maneuver.

19. The method of claim 18, wherein calculating a quantity of time to a critical decision point further comprises:

determining whether the quantity of time to the critical decision point is less than a predetermined minimum threshold time based in part upon: host vehicle speed, and a speed of other vehicles in target alternate vehicle lanes; and upon determining that the quantity of time to the critical decision point is less than the predetermined minimum threshold time, creating a speed profile with a highest possible speed adjustment and alerting the vehicle operator to take over control of the host vehicle for lane change execution; and upon determining that the quantity of time to the critical decision point is greater than or equal to the predetermined minimum threshold time, executing control logic for:

calculating a host vehicle speed adjustment based on a critical distance and time;

creating a speed profile based on the calculated host vehicle speed adjustment; and continuing to execute the automated lane change.

20. A method for operating a host vehicle to execute automatic lane changes into and out of stop-and-go traffic lanes, the method comprising:

detecting static and dynamic state information about a host vehicle with one or more sensors equipped to the host vehicle;

altering static and dynamic states of the host vehicle with one or more actuators equipped to the host vehicle;

executing, by a processor of a controller of the host vehicle, program code portions stored in memory of the controller, the controller further including input/output (I/O) ports in communication with the one or more sensors and the one or more actuators, the program code portions including an automatic lane change (ALC) application comprising control logic for:

calculating a velocity of other vehicles in an alternate lane, and calculating a size of openings between the other vehicles, including:

calculating the velocity of the other vehicles in the alternate lane based according to a moving average of velocities of other vehicles in a target alternate vehicle lane, wherein the moving average is stored in a buffer having a plurality of samples each lasting for a predetermined quantity of time; wherein the buffer extends for approximately forty (40) seconds, and a total of five (5) samples are included in each buffer; and wherein the samples each extend for approximately eight (8) seconds, wherein a calculated host vehicle speed profile is defined as a sliding average of eight buffers, totaling approximately three-hundred-twenty (320) seconds; and calculating the host vehicle speed profile according to:

$$V_{dl} = \frac{\int_0^{K_t} \sum_0^n \frac{Vx_t}{n}}{K_t} \qquad \text{Eq. 1}$$

where $V_{dl}$ is a velocity for a desired target alternate vehicle lane; $Vx_t$ is a longitudinal velocity of each individual object/or other vehicle in the desired target alternate vehicle lane such that 'x' refers to a longitudinal direction, and 't' refers to each individual object or other vehicle; n is a quantity of objects in the desired target alternate vehicle lane; and $K_t$ is a sample time window, where sample time window $K_t$ is a hard-coded value calibrated for a variety of host vehicle operating conditions;

determining that a difference between a host vehicle velocity and the velocity of the other vehicles is greater than a predetermined host vehicle deceleration limit, including:

upon determining that a difference between a host vehicle velocity and the velocity of the other vehicles in the desired target alternate vehicle lane is greater than a predetermined host vehicle deceleration limit (K_v_DclLim), determining that openings between the other vehicles are within a predetermined range and of a sufficiently large size for the host vehicle to fit; and upon determining that the difference between a host vehicle velocity and the velocity of the other vehicles in the desired target alternate vehicle lane is less than or equal to the predetermined host vehicle deceleration limit (K_v_DclLim);

determining that a difference between the host vehicle velocity and the velocity of other vehicles in the desired target alternate vehicle lane is greater than a predetermined host vehicle acceleration limit (K_v_AclLim); and upon determining that the difference between the host vehicle velocity and the velocity of other vehicles in the desired target alternate vehicle lane is greater than the predetermined host vehicle acceleration limit (K_v_AclLim), determining that openings between the other vehicles are within a predetermined range and of a sufficiently large size for the host vehicle to fit; and upon determining that the difference between the host vehicle velocity and the velocity of the other vehicles in the desired target alternate vehicle lane is less than or equal to the predetermined host vehicle acceleration limit (K_v_AclLim), ending ALC application control of the host vehicle;

determining that openings between the other vehicles are within a predetermined range and of a sufficiently large size for the host vehicle to fit, including:

determining that openings between the other vehicles satisfy predefined maneuver limits including: a current host vehicle velocity (Vx), a velocity of other vehicles (V_dl) in the desired target alternate vehicle lane; a longitudinal length of an opening between other vehicles; the host vehicle deceleration limit (K_v_DclLim) and the host vehicle acceleration limit (K_v_AclLim); predefined mechanical and/or software implemented ADAS-based actuator actuation limits; and wherein an opening that is within the predetermined range is an opening within an area detectable by host vehicle sensors, and on a currently planned autonomously navigable driving route;

commanding one or more of the actuators of the host vehicle to perform an open loop acceleration of the host vehicle, including:

selectively engaging open loop control of the one or more actuators of the host vehicle to engage in an open loop acceleration or deceleration of the host vehicle until either:

a predetermined time limit is exceeded, as defined by:

utilizing a set of calibratable values to determine how long the host vehicle is operated in open-loop deceleration or open-loop acceleration without initiating a lane change from a current host vehicle lane into a target alternate vehicle lane, wherein the calibratable values further comprise:

a short-term time limit and a long-term time limit, the short-term time limit having a value of up to twenty seconds, and the long-term time limit having a value of up to two minutes, each of the short-term and long-term time limits is based on global positioning system (GPS) information, high-definition (HD) map information, and host vehicle indicators; or a difference between the host vehicle velocity and the velocity of the other vehicles is less than or equal to the predetermined host vehicle acceleration limit (K_v_AclLim) or the predetermined host vehicle deceleration limit (K_v_DclLim); and assessing an urgency of a lane change maneuver based on a plurality of factors comprising: a current host vehicle velocity, a distance or calculated quantity of time until the host vehicle will arrive at a route event, wherein the route event comprises one or more of: a lane split, a traffic backup, a traffic jam, a turn, a lane end, and a lane merge;

upon determining that the urgency of the lane change maneuver is low, executing control logic of the ALC application for calculating a quantity of time to a critical decision point, including:

determining whether the quantity of time to the critical decision point is less than a predetermined minimum threshold time based in part upon: host vehicle speed, and a speed of other vehicles in target alternate vehicle lanes; and upon determining that the quantity of time to the critical decision point is less than the predetermined minimum threshold time, creating a speed profile with a highest possible speed adjustment and alerting the vehicle operator to take over control of the host vehicle for lane change execution; and upon determining that the urgency of the lane change maneuver is not low, creating a host vehicle speed profile with a lowest possible speed adjustment and continuing to autonomously execute the lane change maneuver; and wherein upon determining that the quantity of time to the critical decision point is greater than or equal to the predetermined minimum threshold time, executing control logic for:

calculating a host vehicle speed adjustment based on a critical distance and time;

creating a speed profile based on the calculated host vehicle speed adjustment; and continuing to execute the automated lane change by:

selectively engaging one of a closed loop autonomous control of the host vehicle or escalating control of the host vehicle to a human host vehicle operator, wherein the ALC application automatically accelerates the host vehicle according to the host vehicle speed profile and causes the host vehicle to autonomously execute, via actuation of steering actuators and one or more of: powertrain actuators and braking actuators, a lane change from a current host vehicle lane to an alternate lane, wherein the current host vehicle lane has a substantially different velocity than the target alternate vehicle lane.

* * * * *